May 18, 1926. 1,584,870
J. T. LAGERGREN
PRESSURE CONTROLLED VALVE AND SWITCH FOR REFRIGERATING MACHINES
Filed Sept. 19, 1924 3 Sheets-Sheet 2

INVENTOR
Jonas T. Lagergren,
BY
Hood + Hahn
ATTORNEYS

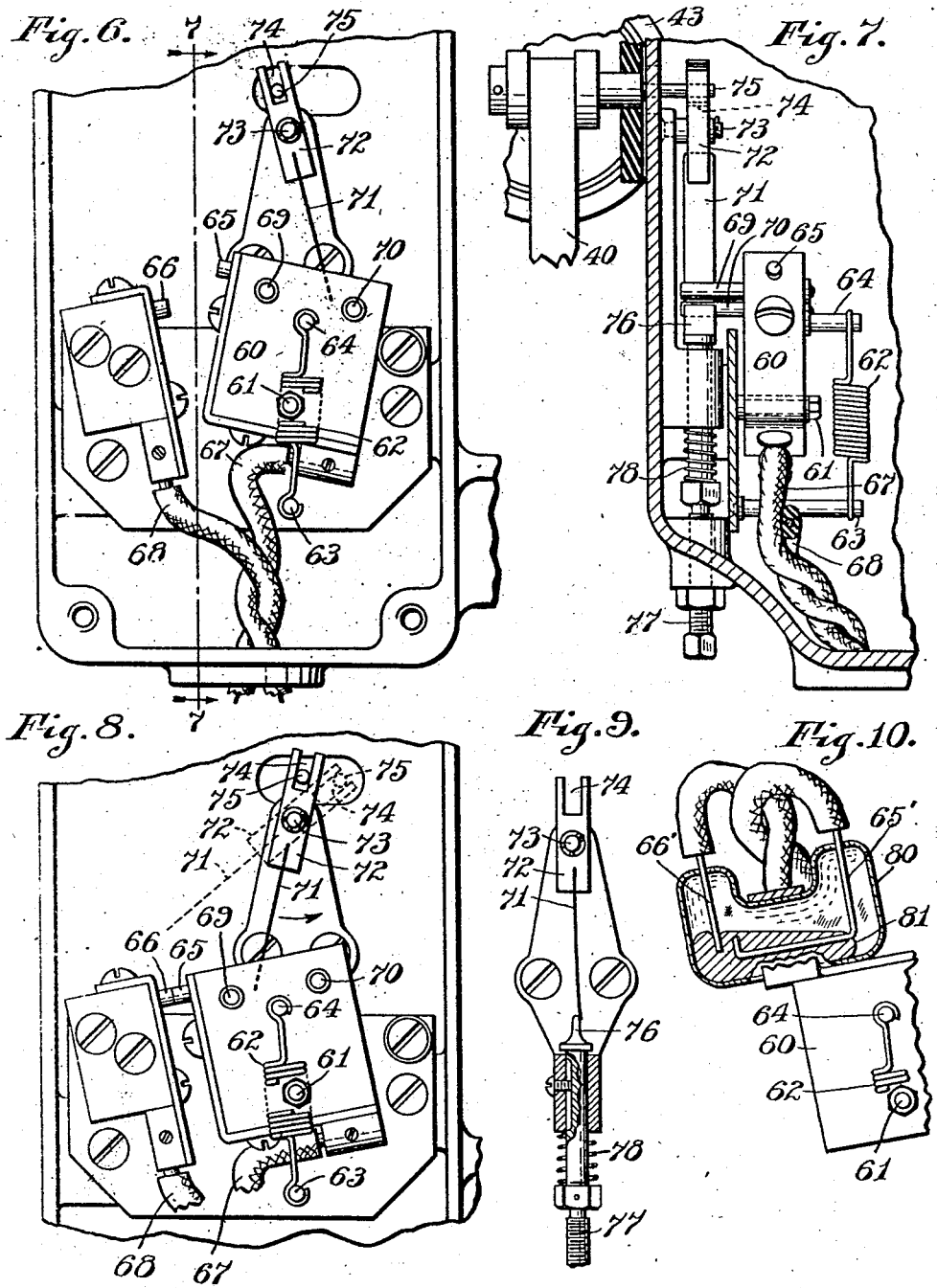

Patented May 18, 1926.  1,584,870

UNITED STATES PATENT OFFICE.

JONAS T. LAGERGREN, OF ERIE, PENNSYLVANIA, ASSIGNOR, BY MESNE ASSIGNMENTS, TO SENTINEL ICE MACHINE COMPANY, OF ERIE, PENNSYLVANIA, A CORPORATION OF PENNSYLVANIA.

PRESSURE-CONTROLLED VALVE AND SWITCH FOR REFRIGERATING MACHINES.

Application filed September 19, 1924. Serial No. 738,566.

The specific object of our invention is to provide automatic means for controlling the flow of condensing water to the condensing coil, and the application of power to the compressor of a refrigerating machine. It will become apparent, however, that while our improvements have been specifically designed for the above-mentioned purpose they will be useful in other relations.

Figure 1:
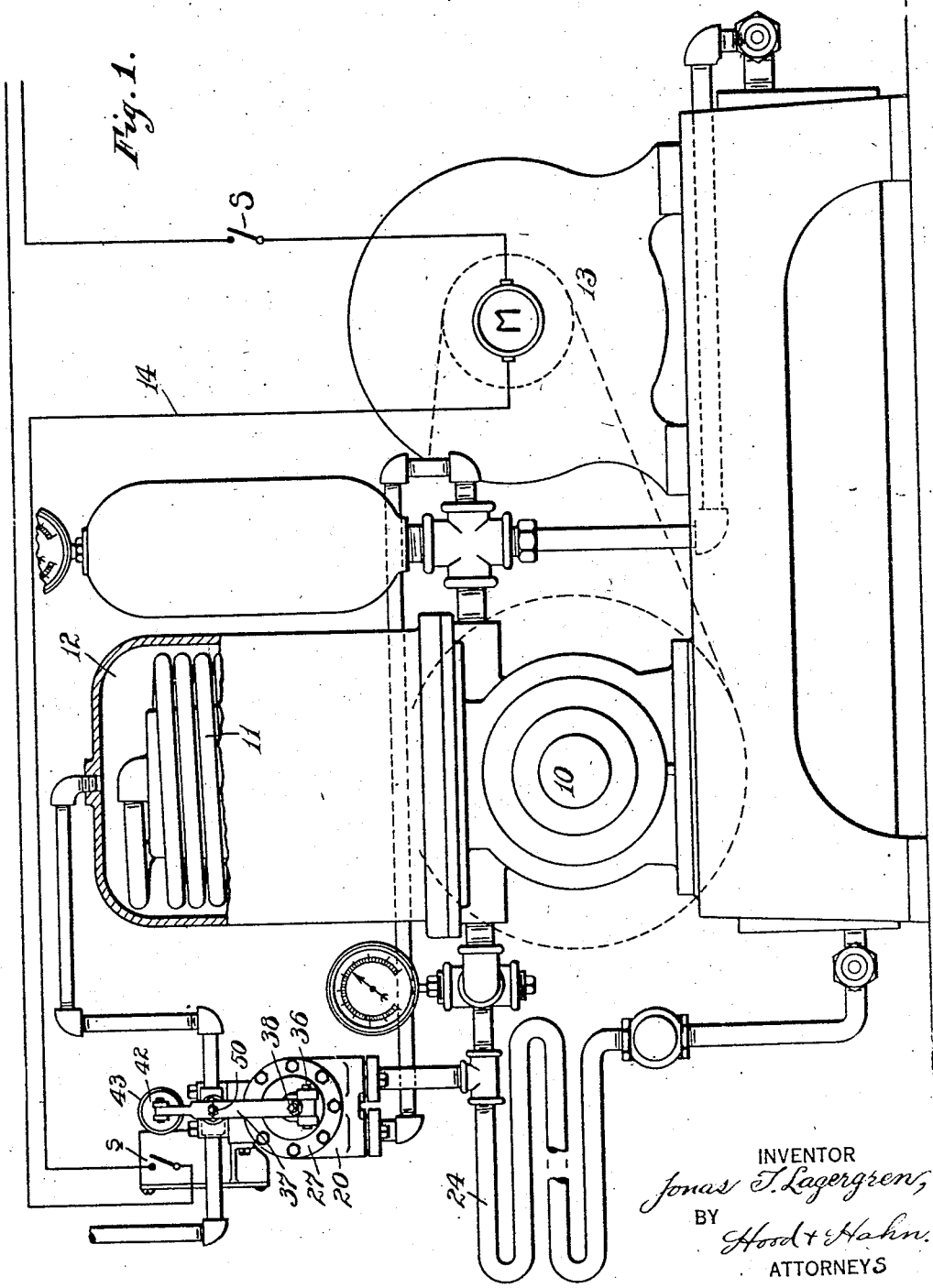
Figure 2:
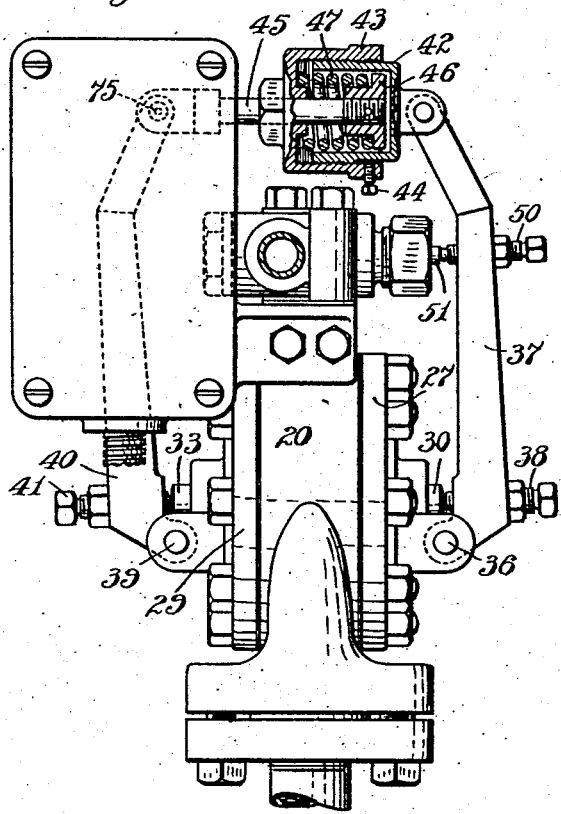
Figure 3:
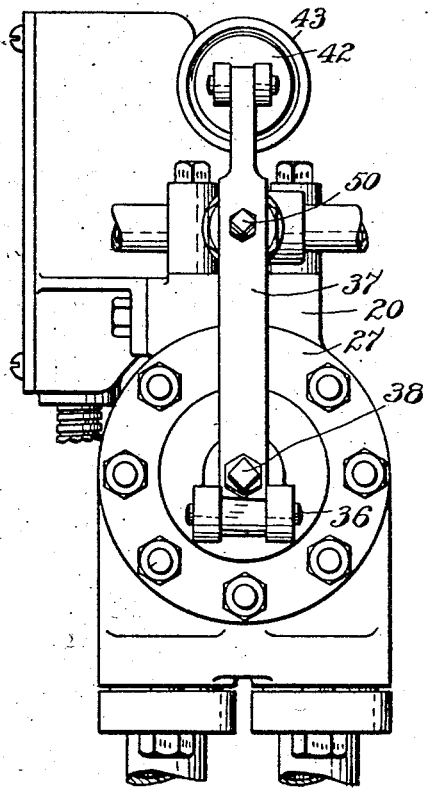
Figure 4:
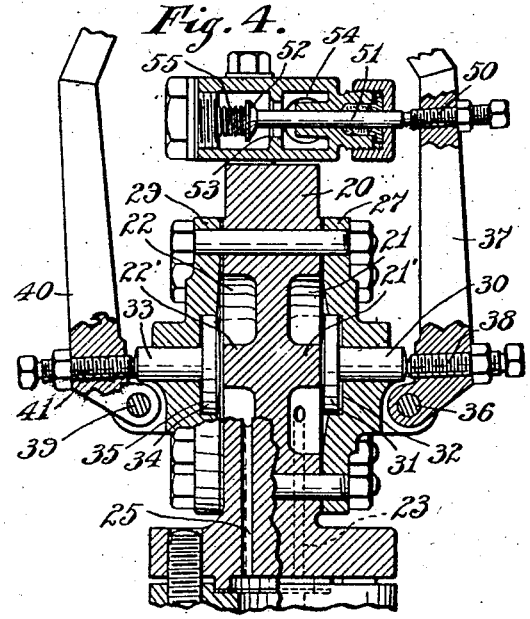
Figure 5:
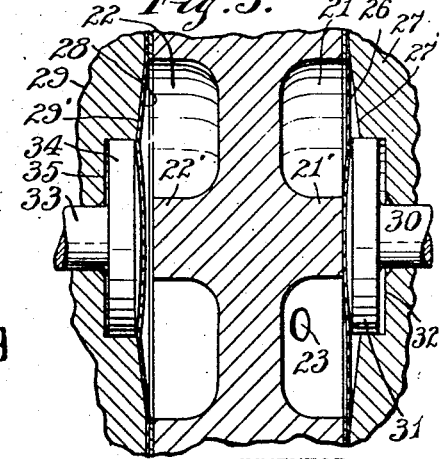

The accompanying drawings illustrate our invention. Fig. 1 is a side elevation, largely diagrammatic in character, of a mechanical refrigerating unit equipped with our improvements; Fig. 2 an elevation, in partial vertical section, of our improved pressure controlled mechanism; Fig. 3 an elevation, at right angles to the plane of Fig. 2; Fig. 4 a vertical section in a plane parallel to Fig. 2; Fig. 5 an enlarged fragmentary section in the plane of Fig. 4; Fig. 6 an elevation of a desirable form of electric switch which may be readily co-ordinated with my pressure controlled mechanism; Fig. 7 a fragmentary section on line 7—7 of Fig. 6; Fig. 8 a view similar to Fig. 6 with the parts in a different position; Fig. 9 a fragmentary detail of parts shown in Figs. 6 to 8; and Fig. 10 a fragmentary sectional detail of a common form of mercury switch.

In the drawings 10 indicates a compressor equipped with a condensing coil 11 and a water jacket 12 and driven by a motor 13 having a power circuit 14, all of ordinary construction.

In an apparatus of the above character, especially small units, the necessary condensation is obtained by a flow of water, generally metered, and it is therefore quite desirable that the water flow be maintained only when necessary. Plants of this kind are operated under such conditions that constant supervision is impracticable, and it is therefore important that the flow of condensing water, and the application of power to the condenser, be automatically controlled.

For this purpose, we have provided the pressure-controlled valve and switch, now to be described.

Our improved valve comprises a main body 20 chambered in its opposite faces to form two independent pressure chambers, one a low pressure chamber 21 and the other a high pressure chamber 22, these chambers being preferably formed with a central boss 21' and 22' respectively, the purposes of which will appear.

Leading into the low pressure chamber 21 is a passage 23 from the low pressure side of the refrigerant system 24, and leading into the high pressure chamber 22, from the high pressure side of said system, is a passage 25. Chamber 21 is covered by a diaphragm 26 held in place by a cover plate 27, and chamber 22 is covered by a diaphragm 28 held in place by a cover plate 29. The central bosses 21' and 22' limit inward movement of the diaphragms 26 and 28 respectively, and outward movement is limited by suitable pockets 27' and 29' formed respectively in the cover plates 27 and 29.

Mounted in cover plate 27 is a plunger 30 provided at its inner end with a head 31 having a limited movement in a pocket 32 and engaging diaphragm 26.

Similarly mounted in cover plate 29 is a plunger 33 having a head 34 at its inner end, and arranged to have a limited movement in a pocket 35 formed in cover plate 29.

Pivoted at 36 on cover plate 27 is a lever 37 carrying at an intermediate point an adjustable temper screw 38 arranged in position to be engaged by the outer end of plunger 30. Pivoted at 39 on cover plate 29 is a lever 40 provided at an intermediate point with an adjustable temper screw 41 arranged to be engaged by the outer end of plunger 33. The two levers 37 and 40 are extended in the same general direction and are of substantially the same length. Pivoted at the outer end of lever 37 is cup 42 over which is threaded a cup 43 held in any desired position of axial adjustment on cup 42 by means of a set screw 44.

Projected through cup 43 is a rod 45 having a head 46 at its inner end within cup 42. A spring 47 is arranged between head 46 and cup 43. The outer end of rod 45 is pivotally connected to the free end of lever 40, the arrangement being such that the outer ends of levers 37 and 40 are connected through the medium of spring 47, the effectiveness of which may be adjusted by an adjustment of cup 43 on cup 42.

At an intermediate point in its length, lever 37 is provided with an adjustable temper screw 50 arranged to engage the outer end of stem 51 of a valve 52 normally urged to its seat 53 in water passage 54 by a spring 55, the arrangement being such that when there is atmospheric pressure in chambers 21 and 22 valve 52 will be closed. Valve 52 controls flow of the cooling medium for coil 11.

Lever 40, within a limited range from one extreme position, is utilized to control motor 13, and as the motor shown in the present drawings is an electric motor, an electric switch is provided for actuation by lever 40. Any form of electric switch may be used, and the form here shown is merely illustrative in character and forms no part of our present invention in so far as specific construction is concerned.

The switch comprises a swinging support 60 which is pivoted at 61 and yieldingly held in either one of its extreme positions by spring 62, one end of which is connected to a suitable support at 63 and the other end connected at 64 to the swinging support 60.

In the form shown in Figs. 6 to 9, inclusive, support 60 carries a terminal point 65 adapted to contact with stationary terminal 66, lead wires 67 and 68 forming part of the power circuit 14 leading respectively to said terminals. The swinging support 60 is provided with a pair of separated pins 69 and 70 adapted to be alternately engaged by a spring leaf finger 71 carried by a lever 72 pivoted at 73 and slotted at 74 to receive a pin 75 carried by lever 40, the movement of lever 40 snapping spring 71 past a center-post 76 adjustable by means of temper screw 77 and spring 78.

Instead of relatively movable terminals 65 and 66 a switch of the mercury type as shown in Fig. 10 may be used. In this form the swinging support 60 carries the mercury holder 80 into which the terminals 65' and 66' respectively are led, a suitable quantity of mercury 81 being provided to form an electrical connection between the two terminals when the block 60 is in one position.

The operation is as follows:—

With the parts normally at rest and atmospheric pressure within the two chambers 21 and 22, diaphragms 26 and 28 are not flexed, and lie a short distance from the stops 21' and 22' respectively; the water valve 52 is closed; and the electric switch is closed, the motor being stationary, however, because one or the other of the switches S, s, in the power circuit 14, will be open. The power circuit being closed through switches S, s, there will be produced in the system high and low pressures which will be communicated to the two chambers 21 and 22, the resultant condition being illustrated in Figs. 2, 4 and 5 where the water valve 52 has been opened, diaphragm 26 will be resting upon stop 21', diaphragm 28 will be resting in pocket 29' but head 34 of plunger 33 will not be fully seated in pocket 35, and spring 71 will have been brought into engagement with stop 76 having a tendency to move in the direction indicated by the arrow in Fig. 8; these being the various positions of normal operation.

Whenever a desired maximum of high pressure is reached and passed, water valve 52 being fully open, further movement (to the left in Fig. 4) of lever 37 is prevented, but further movement of lever 40 may continue by compressing spring 47, and this further movement is utilized to drive spring 71 past stop 76 into engagement with pin 70 of the terminal carrier 60 and thus suddenly break the circuit of the motor. Thereupon a cooling stream of water will continue to flow through the condenser until the pressures within the system have been reduced to a point where lever 40, swinging in a return movement toward normal position will cause spring 71 to snap past stop 76 in the opposite direction and engage pin 69 of carrier 60, causing a closing of the power circuit. If for any reason the pressure in the high pressure side of the system should fall too low, the levers 40 and 37 will return to normal position under the balanced action of the diaphragms 26 and 28 and water valve 52 will be closed under the action of spring 55 so that there will be no waste of water.

I claim as my invention:

1. In a pressure controlled device, the combination of a pair of movable members balanced against each other, a pair of pressure-actuated elements acting in opposite directions upon said members, and a yielding connection between said members causing simultaneous movement in either direction within predetermined pressure limits and permitting independent movement of one of the elements under other pressure conditions.

2. In a pressure controlled device, the combination of two levers, two pressure-controlled means acting upon said levers in opposite directions one upon each lever; and a yielding connection between said levers causing simultaneous movement in either direction within predetermined pressure limits and permitting independent movement of one lever relative to the other within predetermined pressure limits.

3. In a pressure controlled device, the combination of a main body having two pressure chambers formed in the opposed faces thereof, two plungers, one associated with each of said chambers, a diaphragm between each chamber and its plunger, two levers, one associated with each of said plungers, and a yielding connection between said levers causing simultaneous movement in either direction within predetermined pressure limits and permitting independent movement of one of the levers within predetermined pressure limits.

4. In a pressure controlled device, the combination of a main body having two pressure chambers formed in the opposed faces thereof, two plungers, one associated with each of said chambers, two levers, one associated with each of said plungers, and a yielding connection between said levers causing simultaneous movement in either direction within predetermined pressure limits and permitting independent movement of one of the levers within predetermined pressure limits.

5. In a pressure controlled device, the combination of a main body having two pressure chambers formed in the opposed faces thereof, two plungers, one associated with each of said chambers, a diaphragm between each chamber and its plunger, two levers, one associated with each of said plungers, two overlapping connectors, one connected with each of said levers, and a spring interposed between said connectors, said connectors and spring forming a yielding connection between the levers causing simultaneous movement in either direction within predetermined pressure limits and permitting independent movement of one of the levers within predetermined pressure limits.

6. In a pressure controlled device, the combination of a main body having two pressure chambers formed in the opposed faces thereof, two plungers, one associated with each of said chambers, two levers, one associated with each of said plungers, two overlapping connectors, one connected with each of said levers, and a spring interposed between said connectors, said connectors and spring forming a yielding connection between the levers causing simultaneous movement in either direction within predetermined pressure limits and permitting independent movement of one of the levers within predetermined pressure limits.

7. In a refrigerator machine, the combination of a compressor, a circulating system controlled by said compressor, a condenser forming part of said circulating system, a motor for said compressor, a valve for controlling flow of a cooling medium relative to said condenser, a controller for the motor, a pair of levers balanced against each other, a pair of pressure actuated elements acting in opposite directions upon said levers, a yielding connection between said levers causing simultaneous movement in either direction within predetermined pressure limits, and permitting independent movement of one of the levers within predetermined pressure limits, one of said levers acting upon the aforesaid valve and the other of said levers acting upon the controller.

8. In a refrigerator machine, the combination of a compressor, a circulating system controlled by said compressor, a condenser forming part of said circulating system, a motor for said compressor, a valve for controlling flow of a cooling medium relative to said condenser, a controller for the motor, a pair of opposed levers, a yielding connection between said levers requiring limited simultaneous movement in either direction, a pair of pressure controlled elements one acting upon each of said levers in opposition to the other, a pair of pressure chambers, one for each of said pressure controlling elements, a connection between one of said chambers and the low pressure side of the circulating system, and a connection between the other of said chambers and the high pressure side of the circulating system, one of said levers acting upon the valve controlling the flow of cooling medium and the other of said levers acting upon the motor controller substantially as described.

In witness whereof, I have hereunto set my hand.

JONAS T. LAGERGREN.